United States Patent [19]

Frankeny et al.

[11] 3,737,637

[45] June 5, 1973

[54] DATA GENERATOR

[75] Inventors: Richard F. Frankeny; Joey K. Tuttle, both of Longmont, Colo.

[73] Assignee: International Business Machines Corporation, Armonk, N.Y.

[22] Filed: Dec. 13, 1971

[21] Appl. No.: 207,205

[52] U.S. Cl. ..........235/153 A, 235/153 AC, 328/55, 328/56, 328/72

[51] Int. Cl. ..............................................G01r 31/30

[58] Field of Search ...................235/153 A, 153 AC; 328/55, 56, 72

[56] References Cited

UNITED STATES PATENTS 3,633,174 1/1972 Griffin........................235/153 AC X 3,675,133 7/1972 Frankeny et al........................328/55

*Primary Examiner*—Eugene G. Botz

*Assistant Examiner*—R. Stephen Dildine, Jr.

*Attorney*—Gunter A. Hauptman and J. Jancin Jr.

[57] ABSTRACT

Variable delay circuits generate output signals representing test signals having controlled timing widths. The output signals are generated by the variable delay circuits in accordance with data received from a memory under the control of a program of instructions stored in the memory. A fixed cycle clock initiates accessing of instructions one at a time. Each instruction in turn identifies control data which is supplied at times specified by a variable cycle clock. The delay circuits are assigned delay amounts and selected at times calculated to modify signals at their input desired amounts. The delay circuits are selected individually and in combination to give a wide variety of delay amounts. If desired, external input signals may be passed through the data generator with or without modification or may be stored in the memory for subsequent use in generating output signals. Signals resulting from these various operations may be freely interspersed. The output signals may be supplied directly to test a connected system or to an intermediate storage device such as magnetic tape which may subsequently be used to test the connected system.

14 Claims, 12 Drawing Figures

FIG. 1B
| | | INSTRUCTIONS | 0 | 1 | 2 | 3 4 | 5 6 7 | 8 9 10 11 12 13 14 15 |
|---|---|---|---|---|---|---|---|---|
| EMIT | 0 | ELOD | 0 | 0 | 0 | REGISTER (R) | | EMIT (Y) |
| | 1 | ENOD | 0 | 0 | 1 | | | |
| | 2 | EDS(D) | 0 | 1 | 0 | DELAY CIRCUIT (D) | OUTPUT (O) | |
| | 3 | EDA(D) | 0 | 1 | 1 | | | |
| BRANCH | 4 | BCC1 | 1 | 0 | 0 | COMPARE (C) | | BRANCH ADDRESS (B) |
| | 5 | BCC2 | 1 | 0 | 1 | | | |
| | 6 | BCC3 | 1 | 1 | 0 | | | |
| | 7 | BCC4 | 1 | 1 | 1 | | | |
FIG. 1C
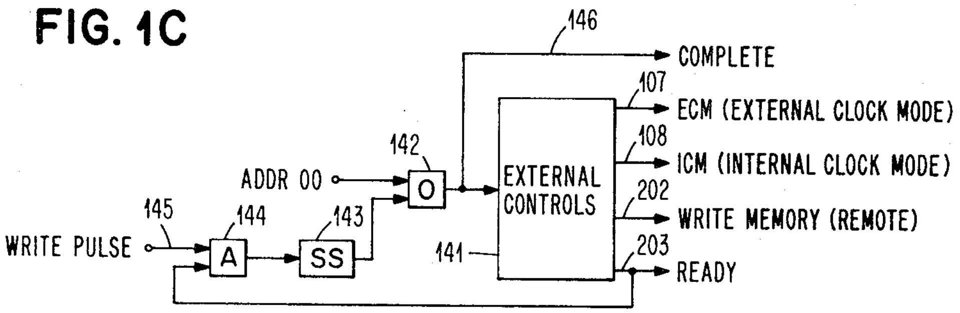
FIG. 1D
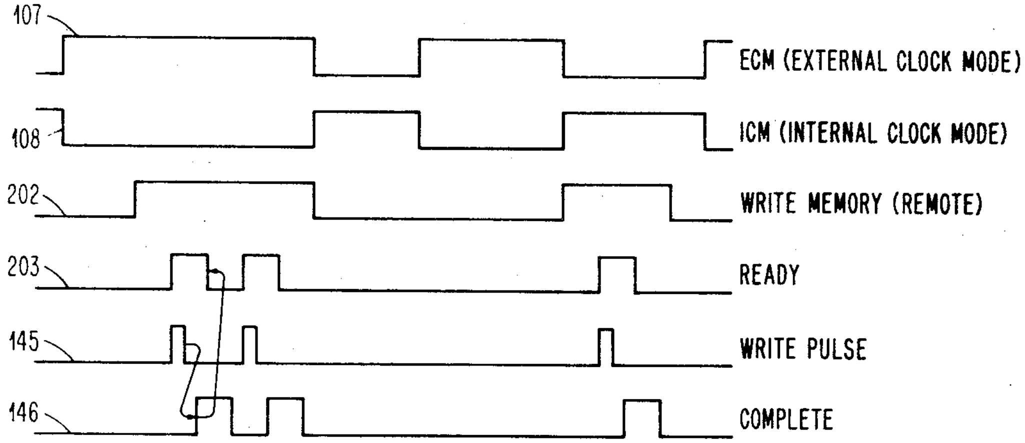

VARIABLE DELAY CONTROL 500

INTERNAL CLOCK CONTROLS 501

DATA GENERATOR

CROSS-REFERENCES

Ser. No. 155,091, filed June 21, 1971, "Apparatus and Method Independently Varying the Widths of a Plurality of Pulses", by R. F. Frankeny and J. K. Tuttle.

BACKGROUND OF THE INVENTION

1. Field of the Invention

The invention relates to electronic data processing and more particularly to generating electronic signals representing data.

2. Description of the Prior Art

Electronic data processing systems and subsystems must be tested during development, manufacturing, prior to shipment, subsequent to installation, etc. for the purpose of determining whether the system will operate correctly in normal use and, if not, the nature and cause of the abnormalities. In a frequently used technique, called "marginal" testing, the tested unit is subjected to signals progressively degraded from the signals for which the unit was designed. The unit is monitored during the progressive degradation of the signals to detect failures. The pattern of failures during marginal testing predicts possible failures during normal operation and, therefore, helps identify corrections that must be made prior to placing the unit into normal operation.

The unit being tested may be subjected to degraded data or control signals. That is, units such as magnetic tape drives use data signals for exchange with magnetic tape and central processing units as directed by control signals originating with associated tape control units, central processing units, etc. In order to properly test a magnetic tape drive, it is desirable to degrade both the data and control signals in order to predict possible failures during normal operation. In the MacDonald U.S. Pat. No. 3,506,814, "Marginal Test Method and Apparatus", Ser. No. 462,971, issued Apr. 14, 1970, and assigned to Burroughs Corporation, data is recorded on a test tape as systematically degraded manifestations. When the tape is read by a tape transport to be tested, the detection of parity errors determines points and types of failures. In the Weiss IBM TECHNICAL DISCLOSURE BULLETIN article, "Equipment Tester", pages 722–723, published August, 1971, systematically degraded information on a test tape is read by the tape transport and analyzed for a variety of overall characteristics, whether or not parity errors occur, to permit analysis of both failures and the abnormalities that may lead to failures.

SUMMARY OF THE INVENTION

This invention is directed to a device capable of both generating information recordable on prior art test tapes and generating or transferring signals which may be directly applied to a tested unit under test without intermediate magnetic tapes. A memory stores a program of data bearing instructions identifying the desired characteristics of every output signal. The desired characteristics are identified by assigning delay values to delay circuits and then connecting the delay circuits in selected groups and sequences between a source of clock pulses and the generator outputs. From the clock pulse are derived signals representing the leading and trailing transition of each pulse as explained in the Frankeny and Tuttle application supra which is incorporated herein by this reference. The transitions are routed to delay circuits to delay each transition independently. Subsequent regeneration of output pulses from the delayed transitions supplies modified output pulses having widths and positions determined by the delays applied to the pulses' leading and trailing transitions. A small number of variable delay circuits may serve a much larger set of input lines by utilizing the delay circuits in time division multiplex.

The instructions stored in memory are normally accessed sequentially to specify the desired delays and the desired delay circuits. Appropriate branching instructions permit control by repetitive instruction sequences as a function of operation conditions. For example, a condition counter may be loaded by one instruction, stepped under the control of operations specified by other instructions, and is compared to predetermined values specified in still other instructions to identify the end of an operation. This permits a sequence of instructions to generate successive sets of progressively more degraded signals repeatedly utilizing the same instruction sequence for each set of signals. The source of clock pulses supplied to the delay circuits for generating the output pulses may be independently varied to provide additional variations and any predetermined delay may be overridden under instruction control. External control signals select gates permitting input information to pass directly to the output, bypassing the variable delay circuits.

The foregoing and other objects, features, and advantages of the invention will be apparent from the following more particular description of a preferred embodiment of the invention, as illustrated in the accompanying drawings.

DESCRIPTION OF DRAWINGS

FIG. 1B is a table illustrating the word format of instructions used by the system of FIG. 1A.

FIG. 1C is a block diagram showing external controls for the system of FIG. 1A.

FIG. 1D is a pulse diagram showing signal sequencing in the external controls of FIG. 1C.

DETAILED DESCRIPTION OF THE DRAWINGS

Description of Preferred Embodiment

Figure 1A:
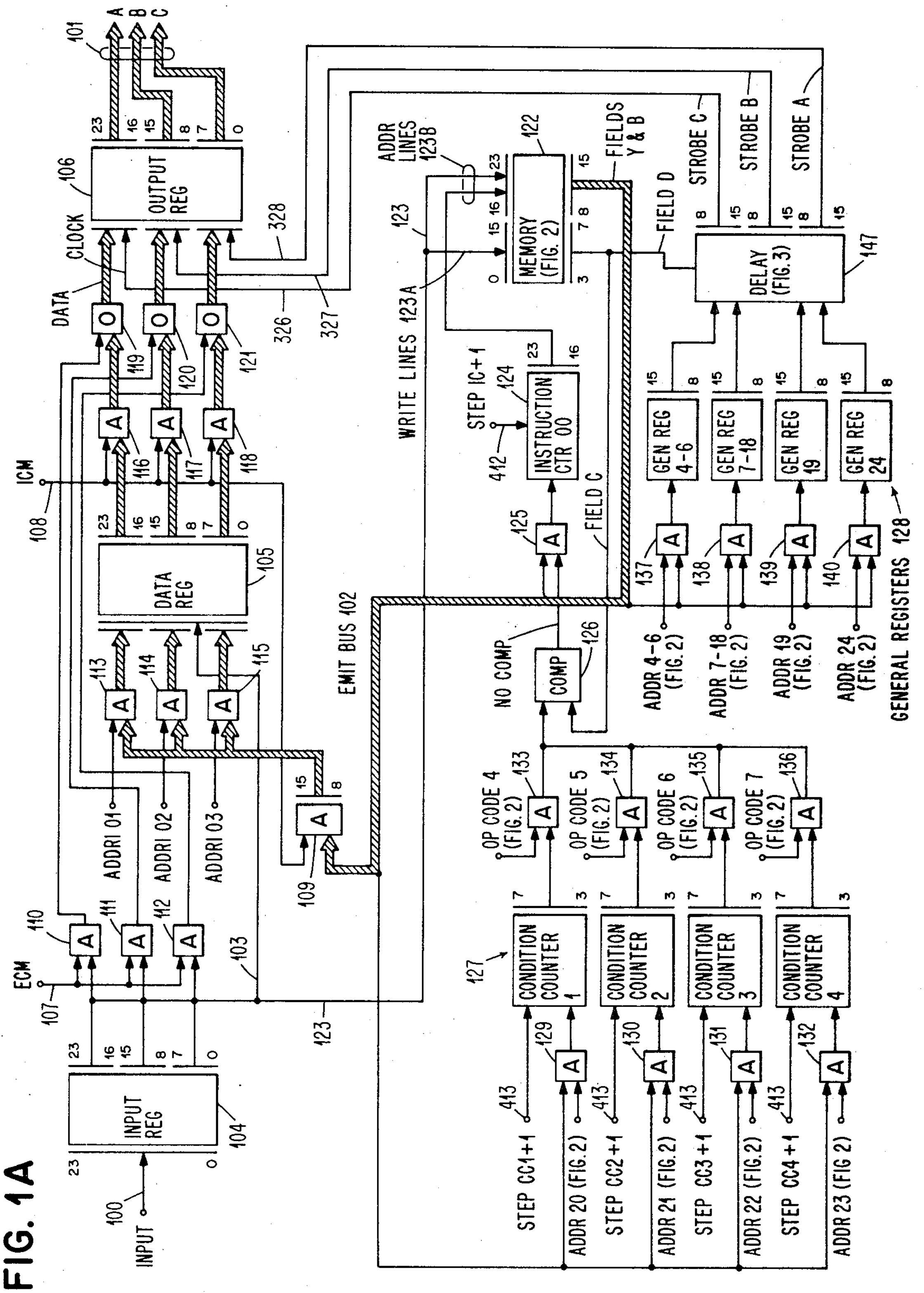
FIG. 1A is a block diagram showing a system incorporating the invention.

FIG. 1A is a block diagram of a system for testing an electronic data processing unit; for example, a magnetic tape transport. For simplicity, the diagram shows groups of wires symbolically as single lines. The number of information bits represented by a line is indicated by bit numbers at appropriate register inputs and outputs. For example, output lines 101 are divided into three groups of eight bits each. The system includes a memory 122 shown in greater detail in FIG. 2 and a delay 147 shown in greater detail in FIG. 3 and disclosed in the previously referenced R. F. Frankeny and J. K. Tuttle application.

A number of output lines 101, illustratively shown as 24 lines, are supplied by an output register 106 as a function of data from a data register and gating strobe signals from the delay 147, during an internal clock mode of operation specified by a signal on ICM line 108. In an external clock mode, an ECM signal 107 replaces the ICM signal 108 permitting the signals on input cable 100 to be passed directly through to cable 101 without change.

The output 101 may be connected to a tape transport for writing information on magnetic tape in accordance with the Weiss IBM TECHNICAL DISCLOSURE BULLETIN article previously referenced. It is not necessary that the tested device be a tape transport, the principles of the invention being equally applicable to a wide variety of units such as other peripheral units, central processing units, communications equipment, and the like.

The external and internal clock modes may be alternated to place on the output 101 signals interleaved from an external source connected to input 100 and internally generated signals on emit bus 102, giving a wide variety of degraded and undegraded signals. In the external control mode, information received on input 100 is stored in input register 104 in groups of three bytes of eight bits apiece. A signal ECM on line 107 selects AND circuits 110, 111, and 112 to gate the stored signals through OR circuits 119, 120, and 121 directly to the output register 106. In the internal control mode, the input register 104 is used to load the memory 122 with control information from input 100, as will be more fully explained below, used to internally generate signals for output 101. The ECM signal on 107 is replaced by an ICM signal 108 which gates information from the emit bus 102 into the data register 105 through AND circuit 109 and then via AND circuits 116, 117, and 118 and OR circuits 119, 120, and 121 to the output register 106 in accordance with strobe signals on lines 326, 327, and 328. It is necessary for the data and clock inputs of output register 106 to cooperatively supply outputs from the output register 106 as explained in the previously referenced R. F. Frankeny and J. K. Tuttle application. The delay 147 supplies 24 strobe signals at times programmed in accordance with instructions in the memory 122. The presence of a strobe signal at a clock input to output register 106 causes the corresponding data input signals to be placed on the corresponding output 101. The absence (i.e. the logical opposite of the "presence") of a clock input holds the output at the value of the last input. It is also possible, using lines 103, to directly degrade signals from lines 100 by transferring the information through data register 105 and output register 106 under delay 147 control in the external control mode.

Figure 2:
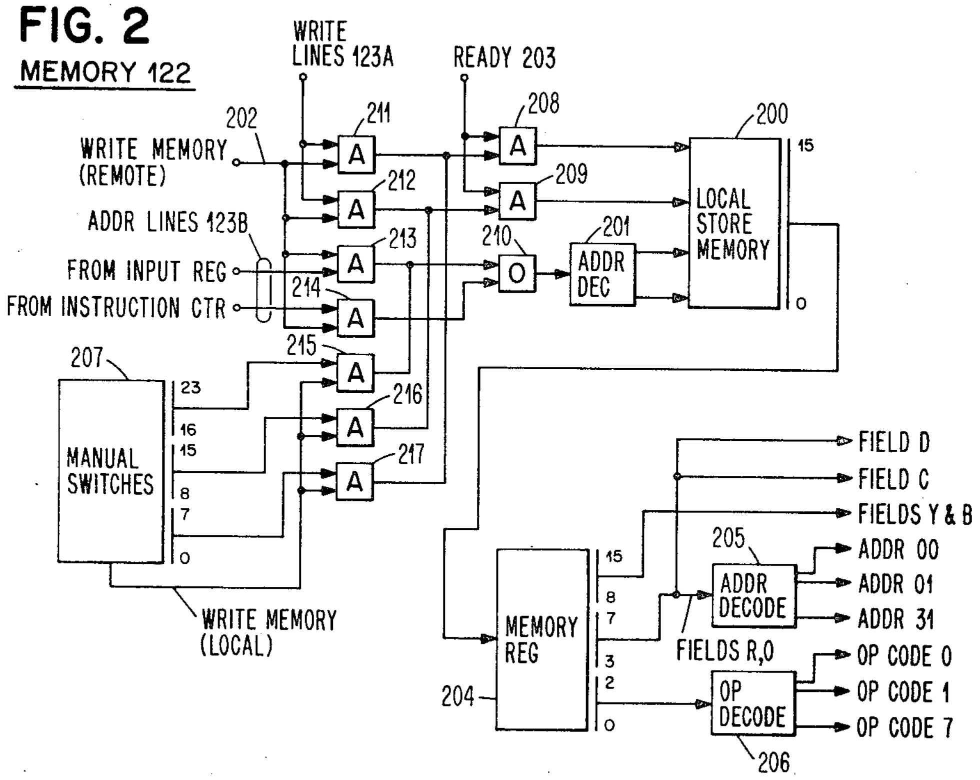
FIG. 2 is a block diagram showing the memory 122 of FIG. 1A.
Figure 4:
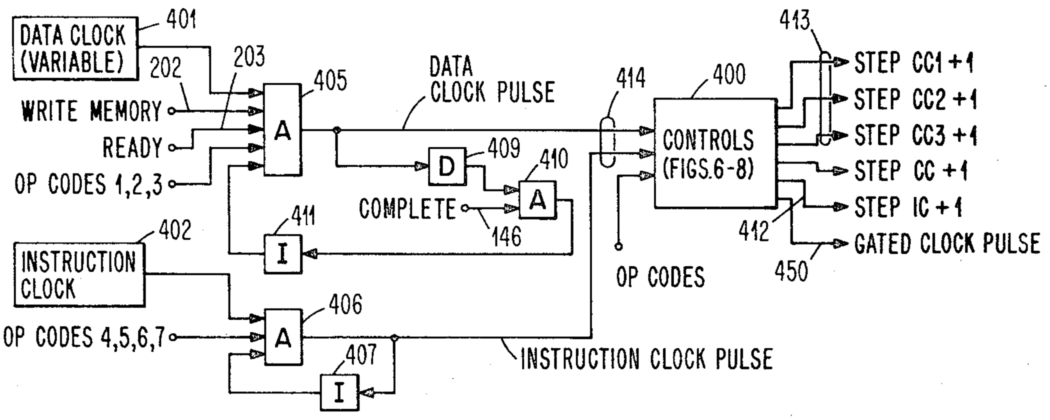
FIG. 4 is a logic diagram showing internal clocks and controls for operating the system of FIG. 1A.

Instructions are entered into the memory 122 from either external input cable 100 or manual switches 207 (FIG. 2). In the external case, sixteen bit instructions are entered one at a time into positions 0–15 of the input register 104 for transfer on cable 123 to memory 122 connected to sixteen bit write input 123A. Alternatively, internal manual switches 207 (FIG. 2) accomplish this directly. The location in which the instruction is stored in memory 122 may be specified by either an instruction counter 124 or the the input register 104 positions 16 to 23, both of which are connected to the address lines 123B. Once instructions are stored in the memory 122, they are accessed by the instruction counter 124. Sequential accessing is obtained by stepping the instruction counter one count each time that a signal occurs on line 412. It is possible to branch from the sequence by setting the instruction counter to a non-sequential address, specified in a branch field B (FIG. 1B) of a current instruction, by gating AND circuit 125 when a comparator 126 indicates that a compare field C (FIG. 1B) of the same instruction does not equal a quantity stored in a condition counter 127 identified by the instruction. Quantities are stored in the condition counters 127 by the emit fields Y (FIG. 1B) of instructions in accordance with condition counter selection signals supplied to AND circuits 129, 130, 131, and 132 from register field R1 (FIG. 1B) of the same instruction. The condition counters 127 are gated to the comparator 126 by signals to AND circuits 133–136 corresponding to particular instructions using individual condition counters. The condition counters are stepped by signals applied to line 413 by controls 400 (FIG. 4). Instructions in the memory 122 also store quantities in general registers 128. The quantities are specified in the emit field Y (FIG. 1B) of the same instruction by gating one of 21 AND circuits represented by the block 137–140. The general registers 128 are also selected to control delay 147 in accordance with quantities stored in the general registers corresponding to the individual delay circuits. Thus, a subsequent instruction may select a delay circuit in delay 147 and corresponding ones of a register 128 will specify a particular delay for that delay circuit. All counters and registers are, for physical convenience, identical and addressable. The following Table I shows illustrative register assignments:

TABLE I

REGISTER ASSIGNMENTS

| Register | Function |
|---|---|
| 00 | Instruction Counter |
| 01 | Data Reg Section A |
| 02 | Data Reg Section B |
| 03 | Data Reg Section C |
| 04 | Selects which line in A is to be delayed |
| 05 | Selects which line in B is to be delayed |
| 06 | Selects which line in C is to be delayed |
| 07–08 | Specified delay for delay circuit d1 |
| 09–10 | Specifies delay for delay circuit d2 |
| 11–12 | Specifies delay for delay circuit d3 |
| 13–14 | Specifies delay for delay circuit d4 |
| 15–16 | Specifies delay for delay circuit d5 |
| 17–18 | Specifies delay for delay circuit d6 |
| 19 | Determines which delay circuits will be tied together |
| 20 | Condition Counter 1 |
| 21 | Condition Counter 2 |
| 22 | Condition Counter 3 |
| 23 | Condition Counter 4 |
| 24 | Determines which delay circuit will be used to delay the output (ECM only) |
| 25–31 | Spare |

The formats of the instructions utilized for operation of the system of FIG. 1A appear in FIG. 1B. Each of the instructions contains 16 bits divided into a number of fields generally described as three bit operation code fields (bit positions 0–2) and 13 bit "address" fields (bit positions 3–15). Each operation code field is decoded by an operation decoder 206 (FIG. 2) to indicate on one of eight operation code lines (0–7) the operation to be performed by the instruction. The address fields are divided into smaller fields (B, C, D, O, R, and Y) which are routed to a number of different destinations explained below. The operations fall into two general categories: emit (E) and branch (B). Each of these provides four variations, for a total of eight. The first two emit variations ELOD and ENOD have address fields divided into a register R field and an emit Y field. The second two variations EDS(D) and EDA(D) of the emit class of instructions have fields divided into three fields: a delay circuit D field, an output O field, and an emit Y field. The branch instructions always contain a compare C field and a branch address B field. The D, O, and R fields are supplied to an address decoder 205 (FIG. 2) which supplies a signal on one of 32 address lines (00–31) identifying one of the registers or counters in Table I. The contents of the Y field are transferred to the register or counter identified by the O or R field of the instruction. The C field is supplied directly to the comparator 126 and the B field is supplied to the instruction counter 124. The first two emit variations may be used to load the registers of Table I and the last three utilize them. Delay circuit delay amounts are initially set into the registers corresponding to the delay circuits by specifying the delay amounts into two successive emit fields Y. It takes two emit instructions to initially load a delay amount. For example, the first emit instruction may load the first register (07, 09, 11, 13, 15, or 17) of a pair with part of the delay amount and the second emit instruction may load the second register (08, 10, 12, 14, 16, or 18) of the pair with the balance of the amount. Subsequent delays may be determined by using only one emit instruction. While there are numerous techniques for storing the delay amount in two registers, a "range" technique has been found especially useful in the invention. The two emit fields Y of the two successive emit instructions are divided into four equal subfields of four bits each. Each subfield identifies a progressively smaller delay amount range for its corresponding delay circuit in accordance with the following Range Field Table II.

RANGE FIELD — TABLE II

| Emit Field Y (Half) | Range (μ Sec.) |
|---|---|
| 0000 | 0.01–0.1 |
| 0001 | 0.1–1 |
| 0010 | 1–10 |
| 0100 | 10–100 |
| 1000 | 100–1000 |

Thus, for example, a delay amount for delay circuit *d*0 may be specified as follows:

EXAMPLE — TABLE III

| | Field | Amount (μ Sec.) | |
|---|---|---|---|
| Register 07 | 1000 | 100–1000 | Minimum Range |
| | 0011 | 300 | 300% of minimum |
| Register 08 | 0101 | 50 | 50% of minimum |
| | 1001 | 9 | 9% of minimum |
| Total | | 359 | |

Larger delays are obtained by connecting delay circuits together in accordance with the contents of general register 19 stored as follows by an emit field Y.

TABLE IV

| Emit Field Y | | | | | | | | |
|---|---|---|---|---|---|---|---|---|
| 8 | 9 | 10 | 11 | 12 | 13 | 14 | 15 | Delay circuits |
| 0 | 1 | 0 | 0 | 1 | 1 | 0 | 0 | (d1, d2) (d4, d5, d6). |
| 0 | 0 | 1 | 0 | 0 | 0 | 1 | 0 | (d2, d3) (d0, d6). |
| 0 | 0 | 0 | 0 | 0 | 1 | 1 | 0 | (do, d5, d6). |
| 0 | 1 | 1 | 1 | 1 | 1 | 0 | 0 | (d1, d2, d3, d4, d5, d6). |
| 0 | 0 | 0 | 0 | 0 | 0 | 0 | 0 | None (Independent). |

The functions of each instruction will now be explained.

EMIT (0) ELOD

The emit instruction ELOD identified by operation code 000 writes data directly from the emit field Y into any of the registers and counters of Table I specified by the register R field. For example, this instruction performs an unconditional branch to the address specified in the emit field Y by addressing the instruction counter 124 with a 000 in field R. The instruction immediately increments the instruction counter 124 prior to execution by applying a signal on line 412.

EMIT (1) ENOD

The emit instruction ENOD identified by operation code 001 performs a similar operation to that of the previous instruction, except that the instruction counter 124 is not incremented immediately, but only after execution is complete and alter all bits are transferred to the output lines 101 (strobes 326–328 are complete). This permits variable clocking of instruction sequences independent of fixed period clocks.

EMIT (2) EDS(D)

The emit instruction EDS(D) writes data from the emit field Y into the data register 105 section identified by operation code 010 specified by the two bit output field 0 for transfer to the output 101 under control of the delay circuit identified by the three bit delay field D. It is assumed that a previous ELOD or ENOD instruction has placed a delay amount into the selected pair of general registers 07–18 for the specified delay circuit. Further, amounts in general registers 4–6 corresponding to data register section A–C, respectively, specify which bits within the selected section will be delayed. The instruction counter is incremented subsequent to execution of this instruction and after specified delays are completed (i.e. all bits are transferred to the output 101).

EMIT (3) EDA(D)

The emit instruction EDA(D) identified by operation code 011 is similar to the previous instruction EDS(D) except that all bits of the section specified by field O are delayed by the delay circuit identified in the D field.

Branch (4) BCC1

The branch instruction BCC1 identified by operation code 100 compares the value in the compare field C to the value in the condition counter CC1. If the comparison shows that the values are not equal, the branch address in field B is placed in the instruction counter 124. If the values are equal, the instruction counter is instead incremented. In both cases, the condition counter 1 is incremented by one.

BRANCH (5, 6, 7) BCC2, BCC3, BCC4

The branch instructions BCC2, BCC3, and BCC4 identified, respectively, by operation codes 101, 110, and 111 operate identically to the branch instruction BCC1 except that they refer to condition counters CC2, CC3, and CC4 respectively.

Referring now to FIGS. 1C and 1D, the operation of control signals used in the operation of FIG. 1A will be explained. The complementary external clock mode signal EMC on line 101 and internal clock mode signal ICM on line 108 are supplied by external controls 141 to differentiate the two modes of operation. The external controls 141 also supply signals on write memory (remote) line 202 indicating that information to be written into the memory from the input 100 (FIG. 1) is available. This occurs during instruction loading prior to internal clock mode operation and during external clock mode. Write pulses occur at regular intervals as a result of clock signals applied to line 145. When a write memory signal occurs on line 202 and the external controls indicate that they are ready with valid data, by the appearance of a ready signal on line 203, a complete pulse will be initiated on line 146 by activating a single shot 143 through the gate 144. The beginning of the complete pulse on line 146 causes the external controls to remove the ready signal from ready line 203. The complete line is also used, during internal control mode, to signal the completion of a program stored in memory, which occurs when the instruction counter (address 00) is addressed.

Referring now to FIG. 2, the memory 122 will be explained in detail with reference to the system shown in FIG. 1A and the controls exercised by the circuit of FIGS. 1B and 1C. The memory 122 contains a local store memory 200 which receives information from AND circuits 208 and 209 when there is a ready signal on the line 203 and stores the information in locations specified by the address decoder 201. Information from the local store memory 200 is available to a memory register 204 whenever the instruction counter 124 is set to a new address. Any type of rotating, core, solid state, etc. storage may be used. For illustration only, the local store memory 200 may comprise a matrix of solid logic bistable devices arranged to store 128 words of 16 bits each with read times on the order of 22 nanoseconds and write times of 5 nanoseconds. Information is entered into the local store memory through AND circuits 208 and 209 upon the occurrence of a ready signal on line 23. Information from 24 manual switches, which may be manually operated switches or electronic latches, is supplied to AND circuits 215, 216, and 217 and gated through them when a write memory (local) signal occurs. The information in positions 8–23 is written into locations specified by positions 0–7. In the case of information available from the input register 104 (FIG. 1A), AND circuits 211 and 212 receive data from write lines 123A to be written into the local store memory 200 in accordance with address information on lines 123B to AND circuit 213. Address information is also received from the instruction counter 124 via AND circuit 214. In each case, the current write memory (remote) signal on line 202 causes the information to be entered into the local store memory 202 when a write pulse and ready signal occur, as explained above. Similarly, data accessed (by a read signal — not shown) appears in the memory register 204 and is available to an address decoder 205, operation decoder 206, and to lines for fields B, C, D, and Y. The operation decoder 206, in a well known manner, decodes the information in positions 0–2 to specify any one of eight operation codes. The information in bit positions 3–7 is decoded by the address decoder 205 to indicate any one of 32 addresses, such as those identified in Table I.

Figure 3:
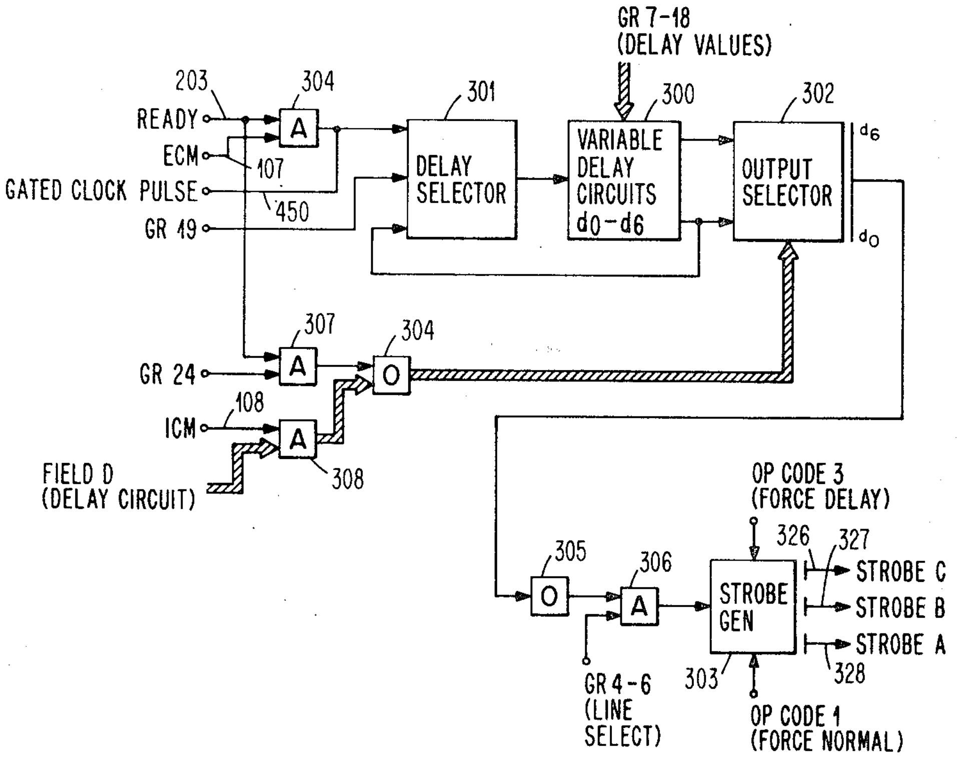
FIG. 3 is a block diagram showing the delay 147 of the system in FIG. 1A.

Referring now to FIG. 3, the delay circuit 147 is schematically shown. Reference is made to application Ser. No. 155,091, "Apparatus and Method Independently Varying the Widths of a Plurality of Pulses", by R. F. Frankeny and J. K. Tuttle, filed June 21, 1971, for a more detailed explanation of the operation of the apparatus for independently varying widths of a plurality of pulses. Variable delay circuits 300 are interconnected by a delay selector 301 in accordance with the contents of general register 19 and accessed by output selector 302 in accordance with field D of the current instruction in ICM and the contents of general register 24 in ECM. There are 7 delay circuits 147, one of which (d0) defines a normal time base. Additional variable and manually adjustable delay circuits may be provided. The delay circuits d1 through d6 may be interconnected in accordance with information in general register 19 as shown in Table IV, each delay circuit having an assigned delay value specified by its corresponding general registers 7–18 (identified in Table I) selected by field D of an instruction. During external control mode, general register 24 selects the desired delay circuits. In the internal control mode, data in the data registers 105 is gated to the output registers 106 for release to the output 101 at times determined by strobe signals A, B, and C on lines in groups 326, 327, and 328 selected by the contents of general registers 4–6. Normal data timing is determined by a data clock 401 (FIG. 4) which supplies gated clock pulse transitions to the delay 147 on line 450. To cause an output on line 101 to be later than the nominal time, one or more delay lines are selected to insert the desired delay between the time of the transition on line 450 and the selected one of strobe lines in line groups 326–328 to output register 106. It is also possible to cause an output to occur earlier than the nominal time by connecting together delay circuits *d*0 and *d*6, as indicated in Table IV, to increase the total nominal delay time.

In the external clock mode, an external clock signal is supplied by pulsing the ready signal line 203 and delaying information placed in the output register 106 by the input 100 in accordance with delay amounts corresponding to delay circuits selected by general register 24.

Referring now to FIG. 4, the internal clocks and controls which supply the gated clock pulses and signals for stepping condition counters and instruction counters will be explained.

The internal clocks and controls of the type described in IBM TECHNICAL DISCLOSURE BULLETIN, Vol. 14, No. 1, June 1971, Page 38, "Gated Clock with Phase Locked Restart", by L. Fangmeier, R. F. Frankeny, and D. E. Gutscher, are divided into sections used for interpreting instructions and handling data. Instructions are interpreted under the control of a fixed period instruction clock 402 which generates fixed clock pulses during instructions (operation codes 0, 4, 5, 6, and 7) which do not use the delay circuits. AND gate 406 is blocked after each new pulse by an inverter (and inherent delay) 407 feedback circuit. Data is handled in the delay circuits, during appropriate instructions (operation codes 1, 2, and 3) under control of variable clock pulses from a data clock 401 whenever external controls 141 (FIG. 1C) indicate that memory is to be written into. In external clock mode, the instruction clock is not needed and an external clock supplies data clock pulses. Given a selected data clock rate, the start of each variable clock pulse is determined by the occurrence of a ready signal on line 203 and the end is determined by the presence of a complete signal on line 146 to AND gate 410 subsequent to the appearance of a variable clock pulse delayed (to give a minimum pulse width) by circuit 409. Controls 400, further explained with reference to the system operating below, supply stepping signals on lines 412 and 413 and gated clock pulses on line 450 as a function of clock pulses on lines 414 and the specific operation codes of current instructions.

OPERATION OF PREFERRED EMBODIMENT

The operation of the system previously described will now be explained with reference to the flow diagrams of FIGS. 5–8. The diamond shaped boxes identify conditions and the square boxes identify operations. "EXT" refers to signals originating from sources external to the system. Numerals in FIGS. 1–4 will be referenced where helpful to an understanding of the operation.

Figure 5:
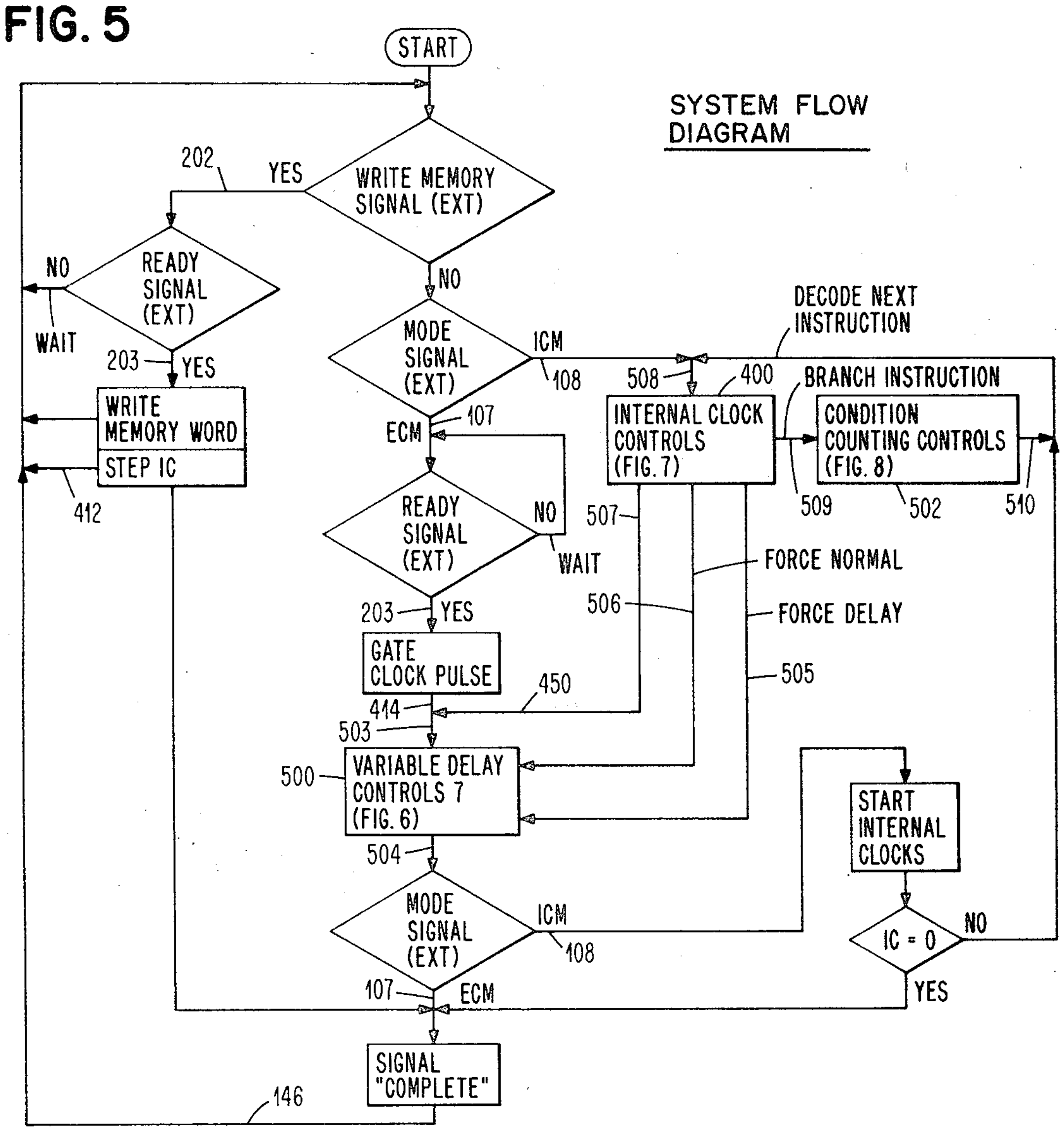
FIGS. 5 through 8 are flow diagrams illustrating the operation of the system of FIG. 1A.

For simplicity, it is assumed that a sequence of operations for loading instructions into memory is followed by a sequence of operations utilizing the loaded instructions to generate data. Instructions are written into local store memory 200 directly from input register 104 on write lines 123 in accordance with addresses specified either on line 123B or by the instruction counter 124. As long as there is a write memory signal, each ready signal (terminated by a complete signal) permits one instruction entry into memory. In FIG. 5, at the start, each write memory signal 202 and ready signal 203 causes a memory word to be written, the instruction counter to be stepped, and a complete signal to be generated. Whenever a ready signal is not present, the system will wait before writing another memory word. In the external control mode, when a write memory signal is no longer present, a ready signal 203 acts as a clock pulse (terminated by complete signal 146) to gate input data to the output 101 via delay circuits selected by general register 24. In the internal control mode, the internal clock controls 501 utilize the variable delay controls 500 to generate output data for each clock pulse from the data clock 401, as long as the ready signal occurs on line 203 and instructions are available. When a branch instruction (operation codes 4–7) occurs, condition counting controls 502 are utilized prior to decoding the next instruction. If the instruction counter becomes 0, a "complete" signal is generated and the ready signal is reset (FIG. 1D) which terminates operation of instruction types 1, 2, and 3 (FIG. 4).

Figure 6:
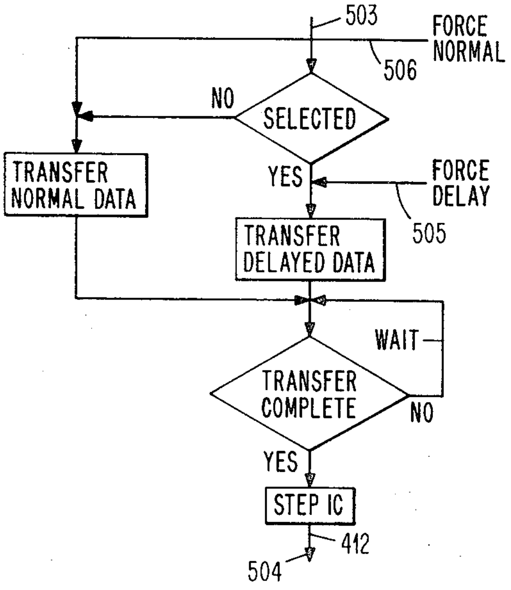

In FIG. 6, the variable delay control for d1, one of 7 delay circuits, is shown. When delay circuit d1 is selected by an instruction, data is transferred in accordance with the delay specified in the associated general registers. The instruction counter is stepped when the transfer is complete. If no bits in the output register 106 are selected, in accordance with select lines from general registers 4–6, by strobe outputs from the strobe generator 305, data is transferred without delay. If a particular output is not selected by general registers 4–6, it may nevertheless be delayed by an instruction which specifically identifies it (force delay) and, similarly, it may be disconnected (force normal) even though it is identified by a general register 4–6.

Figure 7:
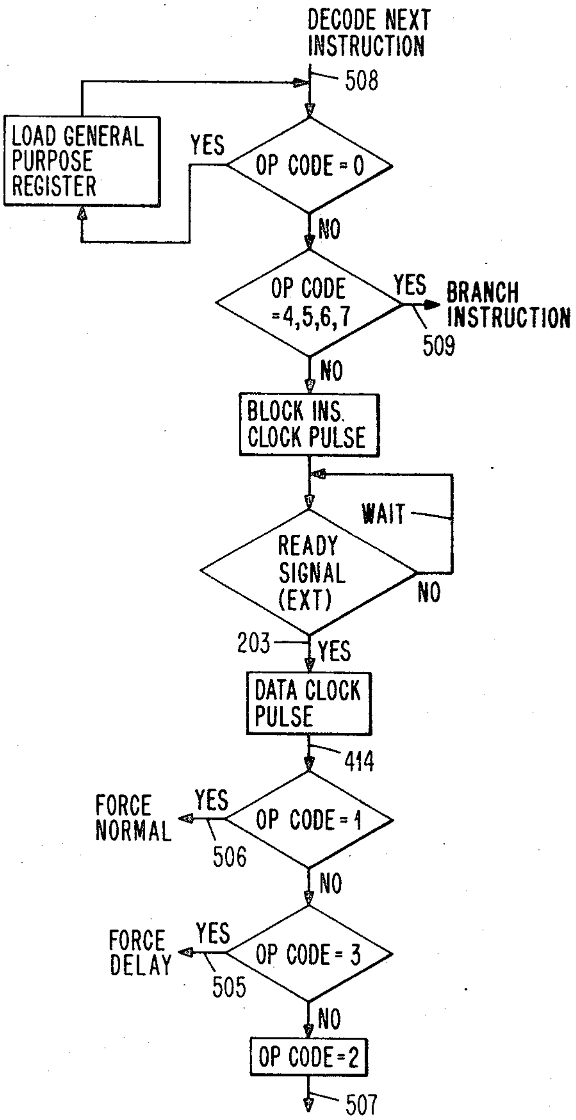

The internal clock controls 400 are shown in FIG. 7. The controls 400 time decoding of instructions and generation of data clock signals. Operation code 0 is used to load the general purpose registers and operation codes 4, 5, 6, and 7 identify branch instructions handled by condition counting controls 502, all under control of the instruction clock 407. Other operation codes 1, 2, and 3 represent instructions requiring the use of the data clock 401 and cause the instruction clock to be stopped. Upon the occurrence of a ready signal 203, data clock pulses are gated for each data transfer, which is not delayed (force normal) for operation code 1, and delayed (force delay) for operation code 3, regardless of delay preselection by general registers 4–6. If the operation code is 2, the selected delay is utilized.

Figure 8:
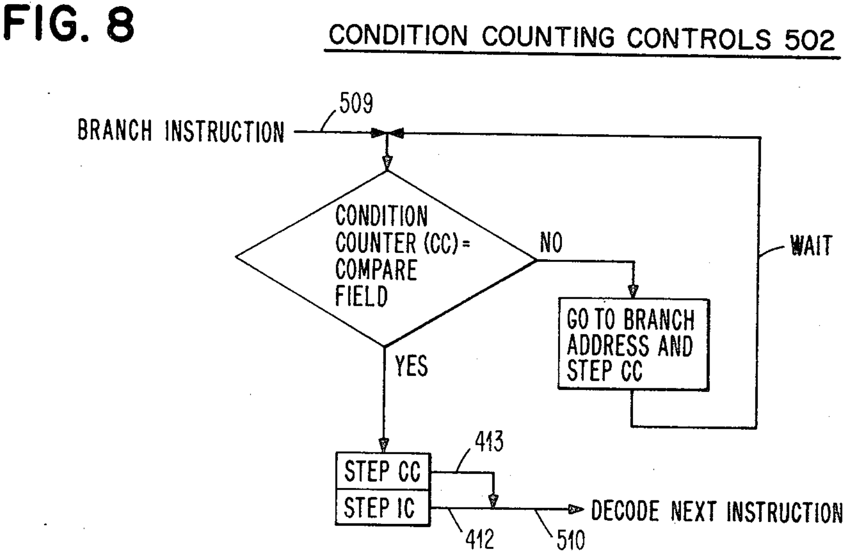

FIG. 8 shows the operation of the condition counting controls when a branch instruction occurs. The contents of the condition counter identified by the instruction's operation code are compared to the compare field C of the instruction. If the quantities are not equal, the instruction counter 124 is loaded with the value in the branch address field B and the condition counter is stepped one. After repeated stepping of the condition counter, condition counter contents will eventually equal the compare field, in which case, the instruction counter is stepped to decode the next instruction.

Figure 9:
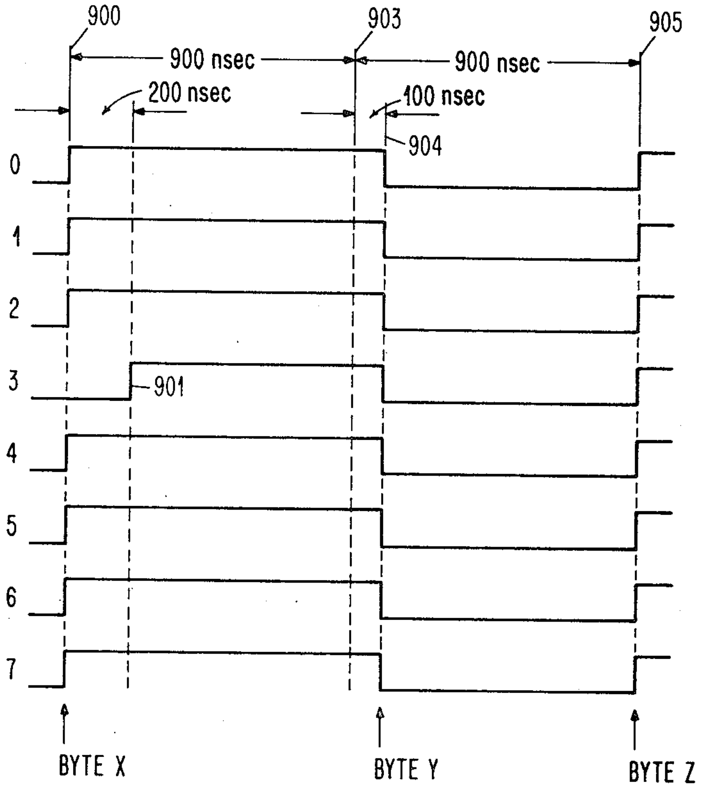
FIG. 9 is a pulse diagram illustrating signals present during an example of the system's operation.

To further illustrate operation of the invention, the solution of a sample problem will now be given. It is assumed that a magnetic tape transport used for reading and writing 8 tracks on magnetic tape is being tested by supplying a degraded pattern of 1-bits to all the tracks. As shown in FIG. 9, successive data bytes X, Y, Z are spaced 900 nanoseconds apart. While tracks 0–2 and 4–7 of byte A occur at the normal time 900, track 3 occurs 200 nanoseconds late at time 901. All tracks of byte Y are delayed from their normal time 903 to occur 100 nanoseconds late at time 904. All tracks of byte Z occur at the normal time 905. A program for causing the invention to achieve and repeat this pattern will generally take the form that follows:

TABLE V

| | OP Code | Reg (R) Field | Emit (Y) Field | Comment |
|---|---|---|---|---|
| 0 | 000 | 00100 | 11101111 | Selects track **3** of section A to be delayed |
| 1 | 000 | 00111 | 00010010 | Programs delay circuit **d1** for 200 nanoseconds delay |
| 2 | 000 | 01000 | 00000000 | |
| 3 | 000 | 01001 | 00010001 | Programs delay circuit **d2** for 100 nanoseconds delay |
| 4 | 000 | 01010 | 00000000 | |
| 5 | 000 | 10011 | 00000000 | Indicates that no delay circuits tied |
| 6 | 000 | 10100 | 00000001 | Sets condition counter **CC1** to 1 |
| | | (D) (**0**) | | |
| 7 | 010 | 001 01 | 11111111 | Writes track **3** with 200 nanoseconds delay |
| 8 | 011 01 | 010 01 | 00000000 | Writes all tracks with 100 nanoseconds delay |
| | | (R) | | |
| 9 | 001 | 00001 | 11111111 | Writes all tracks with zero delay |
| 10 | 100 | 10000 | 00000111 | Repeats pattern **16** times [branch to instruction (7)] |
| 11 | 000 | 00000 | 00000000 | Ends Program |

While the invention has been particularly shown and described with reference to preferred embodiments thereof, it will be understood by those skilled in the art that various changes in form and details may be made therein without departing from the spirit and scope of the invention.

What is claimed is:

1. In an apparatus for supplying degraded signals useful for testing a signal-responsive unit:

a source for supplying a plurality of normally timed signals within the normal operating range of the tested unit; and variable delay means, connected between said source and said tested unit, operable to progressively and selectively delay predetermined ones of said plurality of timed signals until they are outside the normal operating range of the tested unit.

2. The apparatus of claim 1, wherein the source of said timed signals is a selected one of an external source of a plurality of normally timed signals and a single internal signal generator.

3. The apparatus of claim 2, wherein the single internal signal generator comprises an oscillator and control means for modifying signals from the oscillator.

4. A data generator for generating degraded data for a tested unit, including:

a source of normal input signals;

variable delay circuits having an input connected to said source and an output, and operable in accordance with specified delay values to delay normal input signals to form at the output degraded output signals;

delay register means, connected to said variable delay circuits, for specifying delay values in accordance with supplied delay value signals divided into a plurality of range sections, the sections manifesting progressively smaller ranges of delay values; and supply means, connected to said delay register means, for supplying delay value signals.

5. The generator of claim 4, wherein the means for supplying delay value signals include a storage means containing manifestations indicative of delay values.

6. The generator of claim 5, wherein the manifestations in said storage are arranged in a sequence and there is provided a counter for accessing said manifestations in said sequence.

7. The generator of claim 6, wherein there are further provided counting and comparing means operable in cooperation with said storage means to permit repeated use of the same delay values.

8. A combination for supplying a plurality of time variable output signals, comprising:

a source of clocking signals;

a plurality of delay registers operable to store delay value signals;

a plurality of variable delay circuits, connected to said clocking signals source and to said delay registers, operable to delay the clocking signals in accordance with said delay value signals; and a data storage means, connectable to said variable delay circuits and registers, operable to supply delay values to said registers and to identify particular delay circuits.

9. The combination of claim 8, wherein there are additionally provided:

gating means for interconnecting the delay circuits; an interconnection register, associated with said gating means, for storing signals indicative of interconnections to be made by said gating means; and means for supplying from said data storage means to said interconnection register signals identifying particular delay circuits which are to be interconnected.

10. The combination of claim 9, wherein there are provided:

control means, associated with said data storage means and said interconnection register, for blocking specified interconnections in accordance with signals from said storage.

11. A source of timed signals for testing an electronic device, including:

a store capable of storing information, accessible as signals, characterized as instructions, each instruction having two fields;

variable signal modifying means, connected with said store and having data and control inputs and data outputs, operable to modify as signals at its data output data input signals received at its data inputs in accordance with information received at its control inputs from said store;

instruction decoding means, connected to said store, operable to interpret information received from said store; and control means, connected to said instruction decoding means and said variable signal modifying means, operable to supply information from one field of instructions in said store to said variable signal modifying means control unit in accordance with interpretation information from the other field.

12. A method comprising:

supplying clocking signals;

storing delay value signals in delay registers;

supplying delay values to said registers identifying particular delay circuits;

delaying the clocking signals in accordance with said delay value signals;

storing signals indicative of interconnections to be made between delay circuits; and supplying signals identifying particular delay circuits which are to be interconnected.

13. The method of claim 12, including the further step of:

blocking specified interconnections in accordance with blocking signals.

14. A method for testing an electronic device, including the steps of:

entering in a store signals, characterized as instructions, each instruction having two fields;

modifying in a signal modifier data input signals in accordance with control information from said store;

interpreting information received from said store; and supplying information from one field of instructions in said store to said signal modifier in accordance with interpretation information from the other field.

* * * * *